(12) United States Patent
Hoijtink et al.

(10) Patent No.: US 8,128,732 B2
(45) Date of Patent: Mar. 6, 2012

(54) DEVICE AND METHOD FOR SEPARATING A FLOWING MEDIUM MIXTURE INTO FRACTIONS

(75) Inventors: Reinoud Hoijtink, Vissoie (CH); Jozef Johannes Hubertus Brouwers, Lanaken (BE)

(73) Assignee: Romico Hold A.V.V., Oranjestad (AW)

( * ) Notice: Subject to any disclaimer, the term of this patent is extended or adjusted under 35 U.S.C. 154(b) by 651 days.

(21) Appl. No.: 12/280,422

(22) PCT Filed: Feb. 13, 2007

(86) PCT No.: PCT/NL2007/050056
§ 371 (c)(1),
(2), (4) Date: Jan. 21, 2009

(87) PCT Pub. No.: WO2007/097621
PCT Pub. Date: Aug. 30, 2007

(65) Prior Publication Data
US 2009/0301296 A1    Dec. 10, 2009

(30) Foreign Application Priority Data
Feb. 23, 2006    (NL) .................................... 2000016

(51) Int. Cl.
*B01D 45/14*    (2006.01)
(52) U.S. Cl. .................. 95/35; 95/270; 55/406
(58) Field of Classification Search .............. 55/400, 55/406, 408; 95/31, 34, 35, 267, 268, 269, 95/270, 272, 277
See application file for complete search history.

(56) References Cited

U.S. PATENT DOCUMENTS

| | | | | |
|---|---|---|---|---|
| 4,135,898 A | * | 1/1979 | Rosengard | 55/419 |
| 4,626,237 A | * | 12/1986 | Galloway, Jr. | 494/37 |
| 4,994,097 A | * | 2/1991 | Brouwers | 55/317 |
| 5,073,177 A | * | 12/1991 | Brouwers | 55/317 |
| 5,667,543 A | * | 9/1997 | Brouwers | 55/317 |
| 6,033,450 A | * | 3/2000 | Krul et al. | 55/345 |
| 6,398,833 B1 | * | 6/2002 | Santerre et al. | 55/409 |
| 6,592,654 B2 | * | 7/2003 | Brown | 95/270 |
| 6,640,933 B2 | * | 11/2003 | Henry et al. | 184/5.1 |
| 7,550,032 B2 | * | 6/2009 | Brouwers et al. | 95/141 |

(Continued)

FOREIGN PATENT DOCUMENTS
EP    0047677 A2    3/1982
(Continued)

OTHER PUBLICATIONS
Search Report for International Patent Application No. PCT/NL2007/050056; Jun. 1, 2007.
(Continued)

*Primary Examiner* — Duane Smith
*Assistant Examiner* — Sonji Turner
(74) *Attorney, Agent, or Firm* — Jason A. Bernstein; Barnes & Thornburg LLP

(57)    ABSTRACT

A device for separating a flowing medium mixture into at least two fractions, comprising rotating means (7) in the form of a rotating assembly of feed channels (6) for rotating the flowing mixture for separating, a feed for the medium mixture (5) for separating connecting to the rotating means, and an outlet connecting to the rotating means for discharging one of the fractions of the separated medium mixture, wherein the medium mixture can display a substantially turbulent flow during separation. Also disclosed is a method for separating a flowing medium mixture.

7 Claims, 3 Drawing Sheets

U.S. PATENT DOCUMENTS

| | | | |
|---|---|---|---|
| 2003/0010572 A1* | 1/2003 | Henry et al. | 184/5.1 |
| 2005/0120685 A1 | 6/2005 | Fischer et al. | |
| 2006/0225386 A1* | 10/2006 | Brouwers et al. | 55/319 |
| 2010/0037771 A1* | 2/2010 | Christensen et al. | 95/35 |

FOREIGN PATENT DOCUMENTS

| | | |
|---|---|---|
| EP | 0957352 A1 | 11/1999 |
| GB | 604927 | 7/1948 |
| NL | 8700698 | 10/1988 |
| WO | 9962611 A1 | 12/1999 |
| WO | 2005035995 A1 | 4/2005 |
| WO | 2005118110 A1 | 12/2005 |

OTHER PUBLICATIONS

Search Report for Dutch Patent Application No. 2000016; Oct. 17, 2006.

* cited by examiner

DEVICE AND METHOD FOR SEPARATING A FLOWING MEDIUM MIXTURE INTO FRACTIONS

PRIORITY CLAIM

This patent application is a U.S. National Phase of International Patent Application No. PCT/NL2007/050056, filed Feb. 13, 2007, which claims priority to Netherlands Patent Application No. 2000016, filed Feb. 23, 2006, the disclosures of which are incorporated herein by reference in their entirety.

FIELD

The present disclosure relates to a device for separating a flowing medium mixture into at least two fractions with differing mass density, comprising rotating means for rotating the flowing mixture for separating. The present disclosure, in particular, relates to a method for separating a flowing medium mixture into at least two fractions with differing mass density.

BACKGROUND

The separation of a flowing medium mixture has very diverse applications. For purposes of the present disclosure, the term "medium mixture" means a mixture of solid and/or liquid and/or gas particles of micron or sub-micron size dispersed in at least one liquid or gas. Examples are a gas/gas mixture, a gas/liquid mixture or aerosol, a liquid/liquid mixture, a gas/solid mixture, a liquid/solid mixture, or such a mixture provided with one or more additional fractions. The separation of a flowing medium mixture is, for instance, known from various applications of liquid cleaning, (flue) gas cleaning and powder separation. Separation of fractions with a great difference in particle size and/or a great difference in mass density is relatively simple. Large-scale use is made for this purpose of processes such as filtration and screening. In the separation of fractions with a smaller difference in mass density use is made of chemical separating techniques and/or separating techniques such as sedimentation and centrifugation. Certainly when processing large volumes of medium mixture, chemical separating techniques are less economic and usually also less environmentally-friendly. Separating fractions by means of sedimentation requires time and, when processing larger volumes of medium mixture, makes it necessary to make use of voluminous reservoirs which is, among other things, expensive. Another per se known technology makes use of the differences in mass density of the fractions for separating by applying a centrifugal force to the mixture by causing the mixture to rotate in a centrifuge or a cyclone. This technique is not usually sufficiently selective to realize a separation of the desired level in a short time.

A device of the type stated in the preamble hereinabove is described in Netherlands Patent Application No. 8700698. This device comprises rotating means in the form of a rotating assembly of feed channels for rotating the flowing mixture for separating, a feed for the medium mixture to be separated connecting to the rotating means, and an outlet connecting to the rotating means for discharging the fractions of the separated medium mixture. In a rotating feed channel, the heavier fraction of the mixture for separating is moved further outward toward the wall of the rotating feed channel than the lighter fraction under the influence of the centrifugal force thus resulting in a separation. A drawback of the device from Netherlands Patent Application No. 8700698 is that the device can only be used at relatively low pressures, whereby separation proceeds more slowly than is desirable. The selectivity of the separation is also capable of improvement.

A similar device is disclosed in WO 2005/118110A1. This document on page 3, lines 3-5 mentions the possibility of carrying the medium to be separated through the feed channels under turbulent flow conditions, although laminar flow in the feed channels is preferred. Dependent on the particular process conditions, the device (and particularly the channel dimensions) can be selected accordingly.

SUMMARY

The present disclosure describes several exemplary embodiments of the present invention.

One aspect of the present disclosure provides a method for separating a flowing medium mixture into at least two fractions with differing mass density, the method comprising a) supplying a medium mixture for separating; b) rotating the flowing mixture for separating in rotation means, said rotation means having a rotating assembly of feed channels, wherein the flow of the medium mixture in the feed channels is substantially turbulent; and c) discharging at least one of the separated fractions, wherein the rotational speed of the assembly of feed channels satisfies the condition $\Omega.\tau \leq \alpha.(L/d_h)$, wherein $\Omega$ is the rotational speed, $\tau$ represents the treatment time in the feed channel, $L$ and $d_h$ represent respectively the length and the hydraulic diameter of the feed channel, and $\alpha$ is smaller than 2. Alternatively, $\alpha$ is smaller than 1. Further, alternatively, $\alpha$ is between 0.5 and 1.

The present disclosure provides a device and method with which, with limited investment, inter alia the speed and the quality of the separation of fractions of a flowing medium mixture can be increased.

The present disclosure also provides a method for separating a flowing medium mixture into at least two fractions with differing mass density, comprising the processing steps of: a) supplying a medium mixture for separating, b) causing rotation of the flowing mixture for separating in rotation means provided for this purpose which comprise a rotating assembly of feed channels, with the proviso that the flow of the medium mixture in the feed channels is substantially turbulent, and c) discharging at least one of the separated fractions, wherein the rotational speed of the assembly of feed channels satisfies the condition $$\Omega.\tau \leq \alpha.(L/d_h),$$

wherein $\Omega$ is the rotational speed, $\tau$ represents the treatment time in the feed channel, $L$ and $d_h$ represent respectively the length and the hydraulic diameter of the feed channel, and $\alpha$ is smaller than 3. In the method according to the present disclosure wherein $\Omega < \Omega_{cr}$ and wherein $\Omega_{cr}$ is given by $$\Omega_{cr} = \alpha.(L/d_h)/\tau,$$

the separating process will generally proceed very effectively and will not be noticeably disrupted by internal circulations. It has been found that in methods wherein $\Omega > \Omega_{cr}$, internal circulations adversely affect the process such that the increased yield from separation of particles as a result of rotation more rapid than $\Omega_{cr}$ can be lost. Since higher rotational speeds result in higher material loads and more energy consumption, there are further advantages in practice to limited the rotational speed to values which amount to a maximum of $\Omega_{cr}$, wherein $\alpha=2$, or more preferably a maximum of $\Omega_{cr}$, wherein $\alpha=1$. The method according to the present disclosure is most preferably characterized in that $\alpha$ is between 0.5 and 1.

The method according to the present disclosure is based on the insight that under particular processing conditions, in particular, below a critical rotational speed of the rotating assembly of feed channels, a separation efficiency can be achieved under turbulent flow conditions which is comparable to separation efficiencies, typically obtained under laminar flow conditions.

The method according to the present disclosure is preferably performed such that, during processing step b), the Reynolds number of the flow in at least one feed channel is greater than 2500, and still more preferably greater than 5000. The method can be performed with a relatively small throughflow device since the separate processing steps can be carried out at high pressures and within a very short period of time, for instance in less than 1 second, usually in less than 0.1 second, or even in less than 10 or less than 5 milliseconds. As is already described hereinabove, the method is preferably performed at a pressure of at least 10 bar, and more preferably at least 100 bar. Lengthy processes, with associated devices which are dimensioned such that the associated devices can contain large volumes, are hereby rendered unnecessary.

The device and method according to the present disclosure can, in principle, be applied for the separation of all conceivable medium mixtures into at least two fractions. One exemplary embodiment provides that at least one fraction comprises solid particles. The best results are achieved in the separation of such a preferred mixture.

In another exemplary embodiment of the method according to the present disclosure there is supplied to the device a medium mixture comprising particles, the average diameter d of which satisfies $d \geqq 2\, d_{p100\%}$, wherein $d_{p100\%}$ represents the diameter of a particle which in laminar flow reaches the wall of the feed channel at the downstream end of the feed channel under the influence of the occurring centrifugal forces. This diameter $d_{p100\%}$ can be readily defined by the skilled person, for instance, by experimentation or by calculation.

Additional advantages are achieved if the diameter d of the particles satisfies $d \geqq 2.5\, d_{p100}\%$. It has been found that, particularly under these conditions, a rapid separation can be achieved without detriment to the degree of separation. When particles are presented with a particle size distribution with the stated average diameter, it is possible to achieve almost the same separating efficiency as in the case of the method known in the prior art, where laminar flow occurs in the feed channels.

The method according to the present disclosure can be carried out in a device in which at least one of the feed channels is dimensioned such that the medium mixture displays a substantially turbulent flow in the at least one feed channel. The Reynolds number in the feed channels is preferably greater than 2000, more preferably greater than 2500, still more preferably greater than 3000, and most preferably greater than 5000. Dimensioning at least one of the feed channels for given process conditions such that a substantially turbulent flow is created therein, and carrying out the method of separation according to the process conditions of the present disclosure surprisingly achieves that the speed of separation can increase without necessarily having an adverse effect on the separating capacity of the device. This is surprising since it is generally assumed that a turbulent flow in the feed channels excites secondary flows therein which impede migration of the heavier fraction to the wall of the feed channels. This is particularly the case for medium mixtures in which the fraction for separating comprises particles, and in particular, solid particles, with dimensions at micron and submicron level. The device according to the present disclosure can, therefore, be applied particularly advantageously to separate such a medium mixture. A mixture to be separated in this particularly advantageous manner with the device according to the present disclosure comprises solid particles of a diameter varying from about 0.1 to about 5 micron.

An exemplary embodiment of the device according to the present disclosure comprises feed channels with singly-connected cross-section. In a first exemplary embodiment, each feed channel has a cross-section extending along practically the whole length of the feed channel which extends azimuthally around the rotation axis at an angle smaller than 360° such that the azimuthal flow at an angle greater than 360° to the rotation axis is substantially prevented. In a second exemplary embodiment, a singly-connected cross-section means that each feed channel extends azimuthally around the rotation axis at an angle smaller than 360° such that azimuthal flow at an angle greater than 360° to the rotation axis is substantially prevented in each feed channel, wherein each feed channel is provided with wall portions extending substantially along the total length of the feed channel, wherein the separation is bounded in radial and azimuthal directions relative to the rotation axis. In a third exemplary embodiment, a singly-connected cross-section means that each feed channel extends azimuthally around the rotation axis at an angle smaller than 360° such that azimuthal flow at an angle greater than 360° to the rotation axis is substantially prevented in each feed channel, wherein each feed channel is enclosed by a single wall extending substantially along the whole length of the feed channel.

Although the number of feed channels can, in principle, be chosen within wide limits, it is recommended that the number of feed channels in a radial direction amounts to at least 5, such as, for instance, 15 to 1000, more preferably at least 30 and most preferably at least 50. The at least 5 feed channels preferably extend almost mutually parallel to the rotation axis.

For purposes of the present disclosure, separating of the fractions means at least partly separating the fractions such that a significant difference in the average mass density of the two fractions results; a complete (100%) separation will be difficult to realize in practice. As a result of the rotation of the mixture of the fractions for separating, the lighter fraction will migrate at least substantially to the inner side of the rotation and the heavier fraction will migrate at least substantially to the outer side of the rotation. A possible application is a separation which increases the options for use of at least one of the fractions relative to the mixture. This usable ("cleaned") fraction may still have a part of another undesired fraction even after separation ("be contaminated with another fraction"), but the presence of this other fraction is significantly smaller than the presence of this undesired fraction in the original mixture. The rotating separator in the form of a rotating assembly of feed channels has the advantage that the average distance of the medium from a wall (in radial direction) remains limited, whereby a desired degree of separation can be achieved in a relatively short time (this corresponding to a relatively limited length in axial direction of the rotating separator in combination with a high axial speed, so that more flow rate can be processed). The flow speeds to be applied can be varied or optimized according to the situation. The processing of the medium, wherein the medium is guided through at least one feed channel under turbulent conditions, results in an unexpectedly high separation efficiency without voluminous equipment being required for this purpose (i.e., the device can take a very compact form) and wherein the medium only has to be treated in the device for a short period of time.

A device can be given an even smaller form (with a smaller volume) if the medium mixture is carried through the device under higher pressure. An exemplary embodiment of the device according to the present disclosure therefore comprises pressure means for feeding the medium mixture under pressure to the feed channels, preferably for a pressure which can amount to at least 10 bar, and more preferably for a pressure which can amount to at least 100 bar. The device known in the prior art for rotating separation of a medium mixture comprises feed channels which are dimensioned such that the flow in the channels is laminar. In order to ensure laminar flow in all feed channels, the Reynolds number Re must be smaller than 2000, wherein Re is defined by $$Re = w_0 d_h/v,$$

wherein $w_0$ is the average axial speed of the medium mixture through the feed channels, $v$ represents the kinematic viscosity of the medium mixture and $d_h$ is the hydraulic diameter of the feed channel. The hydraulic diameter is defined by $$d_h = 4 A_0/S,$$

with $A_0$ being the surface area of the cross-section of the channel and S representing the circumference. The kinematic viscosity can be calculated with $$v = \mu/\rho$$

wherein $\mu$ is the dynamic viscosity and $\rho$ the density of the medium mixture. The present disclosure is based on the surprising insight that a turbulent flow may prevail in at least part of the feed channels without having an adverse effect on the separation of the medium mixture into two fractions with differing mass density. The at least one feed channel is dimensioned according to the present disclosure such that a substantially turbulent flow occurs herein under chosen process conditions. Because the Reynolds number depends on the process conditions (more precisely on the average axial speed $w_0$ of the medium mixture through the feed channels, and on the hydraulic diameter $d_h$ of the feed channels), and on the kinematic viscosity $\eta$ of the medium mixture (which in turn also depends on the process conditions), the dimensions of the at least one feed channel are determined on the basis of the chosen medium mixture and the chosen process conditions, and more precisely on the basis of the window of process conditions chosen for the device. Once this window is determined for a given medium mixture, the dimensions of the least one feed channel can be readily determined from the above-stated formula for the Reynolds number.

For gases, the order of magnitude of $\mu$ is $10^{-5}$ kg/(ms). At atmospheric pressures, the density of gases is about 1 kg/m$^3$ so that $v$ is of the order of magnitude of $10^{-5}$ m$^2$/s. In order to ensure laminar flow in the feed channels in the known rotating particle separator, the process conditions and the channel dimensions are chosen in practice such that the Reynolds number is significantly lower than 2000, and generally amounts to about 1000. In the known separating process $w_0$ will be in the order of magnitude of 5 m/s and $d_h$ in the order of magnitude of 2 mm. The device according to the present disclosure can be operated at much higher pressures and/or higher throughput speeds than the known device. When the medium mixture, for instance, a gas mixture, is brought to pressure, the density of the medium mixture will increase while the dynamic viscosity generally changes only a little. When the pressure is increased to, for instance, 10 bar, the kinematic viscosity can soon become a factor of 10 smaller, and the Reynolds number can hereby rise to a value of 10,000. At a pressure of 100 bar the Reynolds number can rise to a value of about 100,000 and higher. The device according to the present disclosure can be operated at such high pressures without the throughflow surface of the feed channels unnecessarily having to be enlarged for this purpose. This enhances the separating efficiency of the device. High pressures are usual in many practical applications, including particle separation in the process industry and the oil and gas industry.

The feed channels of the rotating means of the device can have any desired form. It is thus possible to have the feed channels run in a random curve in the lengthwise direction or, conversely, make the feed channels almost linear. Although not necessary for the present disclosure, a plurality of feed channels will generally be formed by singly-connected walls positioned substantially mutually parallel to the rotation axis of the rotation means. In the known device for separating a medium mixture into at least two fractions, the walls of the feed channels must run almost parallel to the rotation axis of the rotation means. If this is not the case, the component of the rotation in the plane perpendicular to the axis of the feed channel can then cause a Coriolis force, whereby an internal eddying is created in the feed channel in the plane perpendicular to the channel axis, this having a particularly adverse effect on the separating process. An additional advantage of the device of the present disclosure is that, even with feed channels with an axis forming an angle β differing from zero with the rotation axis of the rotation means, the device has a good separating efficiency. The device according to the present disclosure is, therefore, less critical in operation than the device known in the prior art.

It has been found that it is advantageous when the angle β is chosen such that $\beta \leq 10\, d_h/L$ is satisfied, wherein L and $d_h$ represent respectively the length and the hydraulic diameter of the feed channel. The angle β is most preferably chosen such that $\beta \leq 2\, d_h/L$ is satisfied. When production, mounting and operation of the assembly of feed channels (the rotating filter element) in the rotating particle separator take place such that, particularly, the above-stated criteria are satisfied, the separating process will then not be noticeably disrupted, not even at high pressures and/or in the case of small channel cross-sections and/or low viscosity of the medium mixture for separating.

For the best possible operation, it is desirable to have the mass density of the fractions for separating differ as much as possible. If desired, the device according to the present disclosure can be provided for this purpose with means influencing mass density which are situated in front of the rotation means and are, therefore, disposed upstream in the flow direction of the medium. The means influencing mass density can, for instance, comprise expansion means. By means of (optionally isotropic) expansion, the temperature of a medium can be decreased within a very short time, for instance, by applying an expansion cooler of the "joule thomson" type or a turbine. Another option is that the cooling is brought about by a cooling medium which is, for instance, expanded in a separate circulation system so as to be brought to the desired low temperature level. The density of the fractions is affected by temperature decrease. Particularly favourable effects can thus be achieved if the mixture consists of fractions with the same phase (for instance, gas/gas mixture or a liquid/liquid mixture), at least one fraction of which undergoes a phase change due to the temperature change such that the phases of the fractions for separating differ from each other (whereby, for instance, a gas/liquid mixture, a gas/solid mixture or a liquid/solid mixture results). This phenomenon of phase change of a substance as a result of temperature change is a generally known phenomenon. It is, however, expressly noted that for the separation by means of the rotating means it is not essential to create a phase difference between the components for separating; the device is equally applicable to a mixture of fractions which are in the same phase (for instance, liquid/ liquid mixtures such as a dispersed liquid and gas/gas mixtures). Some examples of possible applications of the invention of the present disclosure are the separation of an air/nitrogen mixture, de-aerating or degassing of water, dehydrating of air, cleaning of natural gas, and the like.

The method of the present disclosure is applied particularly for purifying natural gas. In such an exemplary application of the method, natural gas is supplied during processing step a), during an additional processing step the temperature of the natural gas is lowered as a result of expansion to a temperature lower than −50° C., or less than −60° C., whereby the fractions of contaminated substances present in the natural gas, such as, for instance, $CO_2$ and $H_2S$, at least substantially change phase, which contaminated fractions (for instance, $CO_2$ and $H_2S$) are separated from the fraction of hydrocarbons during processing step b)) such that the fraction of hydrocarbons with the contaminants at least partly removed is discharged during processing step c). Using this exemplary method, technically recoverable natural gases contaminated with unwanted gases can be separated to a sufficient extent in economically cost-effective manner from the hydrocarbons present therein.

The method and device according to the present disclosure can also be used to separate condensable liquid-like constituents in natural gas, such as, for instance, the water vapour present in natural gas or the heavier fractions thereof. By cooling the medium mixture, for instance, prior to the separating step, such constituents condense into droplets. The thus formed droplets are then separated from the other constituents in the feed channels. Natural gas can thus be dried in an efficient manner. It is also possible, for instance, in the case where the heavier fraction is being separated, to collect the thus formed petrochemical product.

BRIEF DESCRIPTION OF THE DRAWINGS

Various aspects of the present disclosure are described hereinbelow with reference to the accompanying figures. The present disclosure will be further elucidated on the basis of the non-limitative exemplary embodiments shown in the following figures.

DETAILED DESCRIPTION

Figure 1:
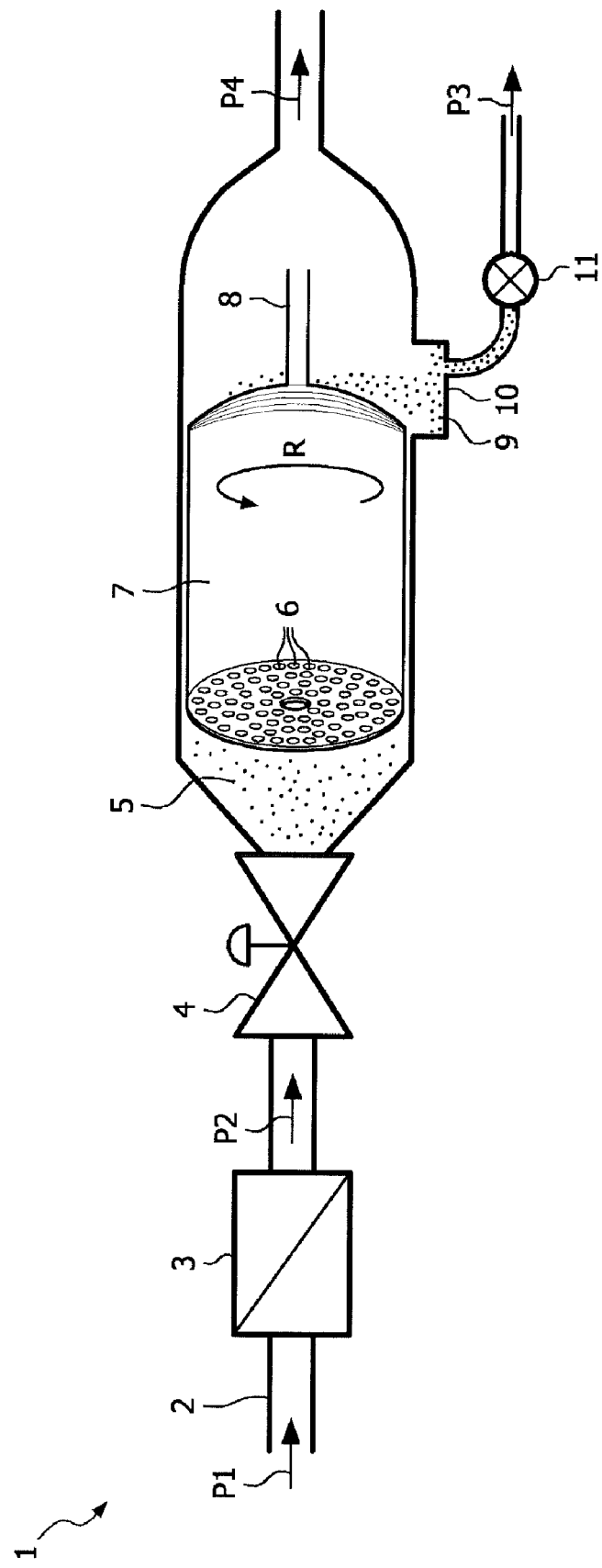
FIG. 1 shows a schematic view of a device according to one exemplary embodiment of the present disclosure.

FIG. 1 shows a device 1 for cleaning a contaminated gas, such as, for instance, natural gas. The contaminated gas is supplied as shown by arrow $P_1$ by a feed 2 under a pressure which can vary from 100 to 500 Bar and higher (a typical pressure amounts, for instance, to about 250 Bar) and a temperature of more than or about 100° C. The gas supplied as shown by arrow $P_1$ is then cooled in accordance with the shown exemplary method in a heat exchanger 3, for instance, by means of cooling into the atmosphere. The cooled gas flows from heat exchanger 3 as shown by arrow $P_2$ to a throttle valve 4. The gas supplied as shown by arrow $P_2$ is expanded by means of throttle valve 4, preferably in isotropic manner, to a lower pressure of between 5 and 20 Bar. As a result of the sudden fall in pressure, the temperature of the gas will fall (for instance, to a temperature lower than −50° C.) such that a part of the fractions present in the gas changes phase. A gas/vapour mixture 5 (aerosol) is created as a result. This gas/vapour mixture 5 is carried through feed channels 6 of a rotor 7 as a result of the rotation R, whereby the vapour condenses against the sides of feed channels 6 of rotor 7 which are remote from a rotation shaft 8. For pressures lying between 5 and 20 bar, the kinematic viscosity v of the gas/vapour mixture 5 will be in the order of magnitude of $10^{-6}$ $m^2/s$. Although it is apparent that the throughfeed speed of the gas/vapour mixture 5 through feed channels 6 can be chosen within broad limits, the axial throughfeed speed $w_0$ usual for economic operation will generally be in the order of magnitude of 5 m/s. On the basis of the normal process conditions, the diameters of feed channels 6 are chosen such that the Reynolds number in channels 6 amounts to at least 2000. In the shown exemplary embodiment, feed channels 6 have a hydraulic diameter of 2 mm corresponding to a Reynolds number of about 10,000. The flow in feed channels 6 is, therefore, substantially turbulent. The condensed vapour leaves rotor 7 as liquid droplets 9 on the side remote from throttle valve 4. Droplets 9, which consist, for instance, of liquid $CO_2$ and $H_2S$, are collected in a basin 10 which can be emptied by means of activating a pump 11 such that the liquid $CO_2$ and $H_2S$ are discharged as shown by arrow $P_3$. The gas leaving rotor 7 thus has $CO_2$ and $H_2S$ at least partly removed and leaves device 1 as shown by arrow $P_4$ as cleaned gas. It is expressly stated that, while the use of a heat exchanger 3 and a throttle valve 4 is recommended, these components are not, however, essential to the present disclosure.

The particle material collected in the feed channels can be removed therefrom by removing the rotating assembly of feed channels from its housing, subsequently cleaning and re-placing the rotating assembly of feed channels, or by replacing the rotating assembly of feed channels with a cleaned rotating assembly. The rotating assembly of feed channels can also be cleaned in situ, if necessary, during operation by subjecting the rotating assembly of feed channels, for instance, to vibrations by producing sound waves or, preferably, by spraying the feed channels under high pressure or by spraying with air or another gaseous or liquid medium.

Figure 2:
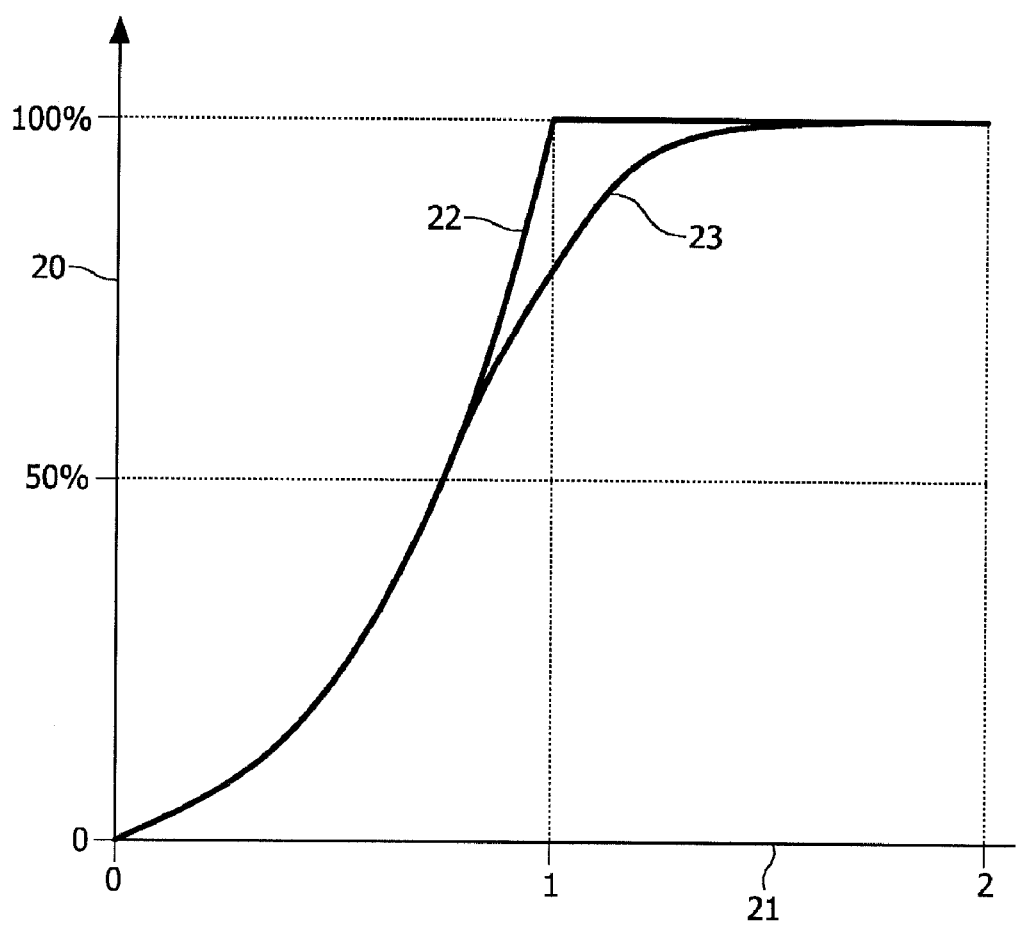
FIG. 2 shows schematically the progression of the degree of separation in percent with the normalized particle diameter.

By ensuring that during operation a substantially turbulent flow is created in feed channels 6, time-dependent and location-dependent fluctuations in the velocity field will occur in addition to an average stationary axial flow. As a result, the fraction particles to be separated make a zigzag movement around the average path corresponding to the path in laminar flow. This path is determined by the average axial speed and the stationary path directed radially outward as a result of the centrifugal force produced by rotor 7. In the absence of turbulence, there will be a precisely 100% chance of a particle with diameter $d_{p100\%}$ being collected. During its stay in a feed channel 6, such a particle undergoes, as a result of the centrifugal force, a radial displacement equal to the diameter of channel 6. Because according to the present disclosure a substantially turbulent flow is present in channels 6, it can be expected that the collection efficiency of particles with diameter $d_{p100\%}$ will be lower (for instance, reduced from 100% to about 80%) than in the device known in the prior art, which is dimensioned such that a laminar flow prevails in feed channels 6 thereof. FIG. 2 shows the progression of the degree of separation 20 (or collection efficiency) set out against the normalized fraction diameter 21 which, for purposes of the present disclosure, is defined as the ratio of the average diameter $d_p$ of the fraction for separating of gas/vapour mixture 5 and the average diameter $d_{p100\%}$ of this same fraction which in a laminar flow would be completely separated at the end of feed channels 6. This average diameter $d_{p100\%}$ can be determined experimentally in simple manner by, for instance, modifying the process conditions such that a laminar flow is created in the feed channels. It is also possible to reduce the channel diameter for this purpose. Curve 22 shows the progression for the known device (laminar flow in feed channels 6), curve 23 shows the progression for the device according to the present disclosure (turbulent flow in feed channels 6). In contrast to what might be expected, FIG. 2 shows that the degree of separation 20 is not noticeably less than for laminar flow despite the fact that the throughfeed speed can be higher. It is moreover found that for particles smaller than about 0.5 $d_{p100\%}$ and larger than 2.5 $d_{p100\%}$, the degree of separation 20 in the device according to the present disclosure even lies at the same level as for the known device.

Figure 3:
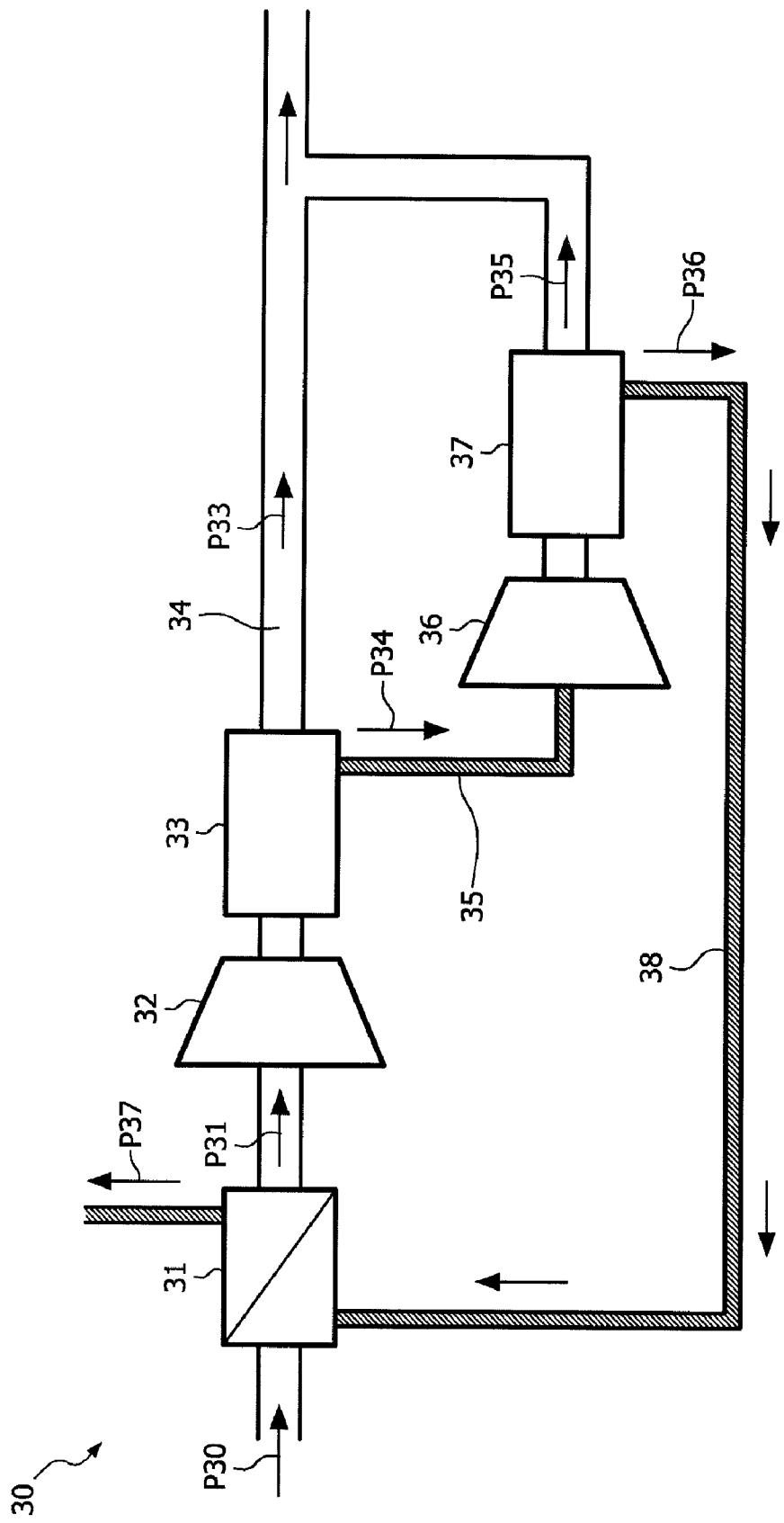
FIG. 3 shows a schematic view of an alternative exemplary embodiment of a multiple separating device according to the present disclosure.

FIG. 3 finally shows a view of a multiple separating device 30 to which a mixture for separating is supplied as shown by arrow $P_{30}$. After cooling of the mixture in a cooler 31, the now cooled mixture flows to a turbine 32 as shown by arrow $P_{31}$. After passing through turbine 32 the mixture, with now a greater difference in the mass density of the fractions for separating, flows to a schematically shown rotating separator 33. A first fraction (for instance, gaseous), leaves rotating separator 33 through an outlet 34 as shown by arrow $P_{33}$. A second fraction (for instance, a cold liquid fraction) leaves rotating separator 33 through a second outlet 35 as shown by arrow $P_{34}$. The second fraction is then fed to another turbine 36 and a rotating separator 37 connecting thereto, where a renewed separating process takes place for the purpose of separating as shown by arrow $P_{35}$, a gas fraction (which may or may not be the same gaseous fraction as already separated in rotating separator 33) remaining in the second liquid fraction, which gas fraction then flows together with the gaseous fraction already separated in the first rotating separator 33. The liquid fraction separated in rotating separator 37 is carried back to heat exchanger 31 through a return conduit 38 as shown by arrow $P_{36}$ in order to increase the efficiency of heat exchanger 31. In heat exchanger 31, the liquid fraction coming from the second rotating separator 37 functions as coolant before the liquid fraction exits device 30 via an outlet 39 as shown by arrow $P_{37}$. It is noted that instead of the second fraction ($P_{34}$), or just as the second fraction ($P_{34}$), the first fraction ($P_{33}$) leaving the rotating separator 33 can also be subjected to a renewed separating process by means of, for instance, a turbine, not shown in this figure, and a rotating separator connecting thereto which connect to outlet 34. Renewed separating of already separated fractions can optionally also be carried out more than twice in succession.

All patents, patent applications and publications referred to herein are incorporated by reference in their entirety.

The invention claimed is:

1. A method for separating a flowing medium mixture into at least two fractions with differing mass density, the method comprising:
    a) supplying a flowing medium mixture for separating;
    b) causing rotation of the flowing medium mixture in rotation means, said rotation means having a rotating assembly of feed channels, wherein the flow of the flowing medium mixture in the feed channels is substantially turbulent causing the flowing medium mixture to be separated into separate fractions; and
    c) discharging at least one of the separated fractions,
    wherein the rotational speed of the assembly of feed channels in which the flowing medium mixture is fed satisfies the condition $\Omega.\tau \leq \alpha.(L/d_h)$, wherein $\Omega$ is the rotational speed, $\tau$ represents the treatment time in the feed channel, L and $d_h$ represent respectively the length and the hydraulic diameter of the feed channel, and $\alpha$ is smaller than 2.

2. The method of claim 1, wherein the Reynolds number of the flow in the feed channels is greater than 2500 during processing step b).

3. The method of claim 2, wherein the Reynolds number of the flow in the feed channels is greater than 5000 during processing step b).

4. The method of claim 1, wherein at least one of the fractions comprises particles, the average diameter d of which satisfies $d \geq 2\ d_{p100\%}$, wherein $d_{p100\%}$ represents the diameter of a particle which in laminar flow reaches the wall of the feed channel at the downstream end of the feed channel under the influence of the occurring centrifugal forces.

5. The method of claim 4, wherein at least one of the fractions comprises particles, the diameter d of which satisfies $d \geq 2.5\ d_{p100\%}$.

6. The method of claim 1, wherein $\alpha$ is smaller than 1.

7. The method of claim 6, wherein $\alpha$ is between 0.5 and 1.

\* \* \* \* \*